US00RE36329E

United States Patent [19]

Laroche

[11] E Patent Number: Re. 36,329

[45] Reissued Date of Patent: Oct. 5, 1999

[54] ROTARY FEEDER FOR THE ACCURATE PLACING OF SHEET ELEMENTS ON FLAT SUPPORTS

[75] Inventor: Francis Laroche, Couronne, France

[73] Assignee: Etudes Services Automatismes Techniques Esatec, S.A., France

[21] Appl. No.: 08/544,094

[22] Filed: Oct. 17, 1995

Related U.S. Patent Documents

Reissue of:

[64] Patent No.: 5,254,071
Issued: Oct. 19, 1993
Appl. No.: 07/731,863
Filed: Jul. 18, 1991

[30] Foreign Application Priority Data

Jul. 20, 1990 [FR] France ..... 90 09541

[51] Int. Cl.[6] ..... B31B 1/90

[52] U.S. Cl. ..... 493/96; 271/106; 271/91; 493/99; 493/210; 493/907

[58] Field of Search ..... 493/96, 99, 210, 493/217, 222, 344, 379, 907, 919, 922, 313, 315, 316, 317; 271/91, 94, 95, 106

[56] References Cited

U.S. PATENT DOCUMENTS

| | | | |
|---|---|---|---|
| 2,099,257 | 11/1937 | Bergstein | 493/96 |
| 3,302,538 | 2/1967 | Hepworth . | |
| 3,386,558 | 6/1968 | Benatar . | |
| 4,350,466 | 9/1982 | Bahr | 414/128 |
| 4,537,587 | 8/1985 | Langen | 493/315 |
| 4,696,715 | 9/1987 | Bahr . | |

FOREIGN PATENT DOCUMENTS

| | | |
|---|---|---|
| 559394 | 12/1983 | Australia . |
| 0 331 325 A1 | 9/1989 | European Pat. Off. . |
| 0 374 556 A2 | 6/1990 | European Pat. Off. . |
| 2 305 298 | 10/1976 | France . |
| 2 487 310 | 1/1982 | France . |
| 3544332 A1 | 6/1987 | Germany . |

*Primary Examiner*—Jack W. Lavinder
*Attorney, Agent, or Firm*—Lerner, David, Littenberg, Krumholz & Mentlik

[57] ABSTRACT

The subject of the invention is a feeder wherein it includes at least one fixed magazine (10) for storing stacked sheet elements (8), one press roller (11) cooperating with a device (4) for continuously feeding each flat support (2) to be provided with one sheet element (8), at least one member (22) for picking up and laying down the sheet elements one at a time by means of suction, and means (12 to 17) for supporting and actuating said picking up member (22), said means being disposed so as to provide said member with at least a partly hypocycloidal trajectory (30, 30') so that two points (31, 32) for turning back the hypocycloid coincide with firstly the point for picking up a sheet element (8) in said magazine (10), and secondly with the point for transferring said element (8) to said press roller (11).

33 Claims, 9 Drawing Sheets

ROTARY FEEDER FOR THE ACCURATE PLACING OF SHEET ELEMENTS ON FLAT SUPPORTS

Matter enclosed in heavy brackets [ ] appears in the original patent but forms no part of this reissue specification; matter printed in italics indicates the additions made by reissue.

FIELD OF THE INVENTION

The present invention concerns the placing on flat supports, such as cardboard cuttings, sheet elements, such as windows or bags, and seeks to resolve the problem of automatically and accurately placing said sheet elements at high speed one at a time on individual flat supports.

BACKGROUND OF THE INVENTION

The production of composite cartons, traditionally made of a pasteboard case inside which a bag or sheath is glued formed by a plastic film, poses the problem of placing bags one at a time on cardboard cuttings without adversely affecting-production rates. In fact, this means that each bag needs to be positioned strictly accurately and effected repeatedly without errors occuring, if possible at the same rate as that of ejecting cuttings at the press outlet.

SUMMARY OF THE INVENTION

The object of the present invention is to resolve this problem and, more generally, to place at high speed any sheet element (plastic film, window, bag, paper, carton, PVC, etc) on a flat support, especially a carton blank or other material, cut and grooved so as to form a folding box, possibly a composite box.

To this effect, the invention concerns a rotary feeder for the accurate placing of sheet elements on flat supports, wherein it includes:

- at least one fixed translation-adjustable magazine for storing stacked sheet elements,
- a press roller cooperating with a device for continuously feeding plat supports each being provided with one sheet element,
- at least one member or device for picking up and laying down the sheet elements one at a time by means for suction, and
- means for supporting and actuating said picking up member, said means being disposed so as to provide the latter with at least a partly hypocycloidal trajectory so that two turning back points of the hypocycloid coincide with firstly the picking up point of one sheet element in said magazine, and secondly with the point for transferring said element to the press roller, by means of which each sheet element is at said first point rendered integral with said picking up member with a relative nil speed between the mobile member and the immobile element and, at second said point, rendered no longer integral with a relative movement freeing said laying down member opposite the press roller, thus ensuring the accurate and continuous positioning at high speed of the sheet elements on said flat supports.

According to one embodiment, said picking up and laying down member is formed of at least one suction cap or cup and the means able to provide this member with said trajectory are formed of a suction cap or cup carrier rotary mounted around an axis parallel to the axis of the press roller parallel to it in synchronism with the rotation speed of the press roller, means indexed on the rotation of the axis of the suction cap carrier being provided so as to provide the suction cap with said hypocycloidal curve with the two turning back points at the two points for respectively picking up and laying down the sheet elements.

In one particular application of the invention when placing bags on composite box carton blanks, said bags are rendered integral able to be detached via the tearing off of heels, the heel/bag unit being bundled and stored in said magazine and, so as to facilitate the pulling up of the bags, means are provided so as, when a bag is picked up, to provide said picking up and laying down member with a slight well-defined backward movement without interrupting the continuous movement of said member for picking up and laying down on a hypocycloidal trajectory.

BRIEF DESCRIPTION OF THE DRAWINGS

Other characteristics and advantages shall appear more readily from the following description, given solely by way, of example, of one embodiment of the invention with reference to the accompanying drawings on which.

DETAILED DESCRIPTION OF THE PREFERRED EMBODIMENTS

Figure 1:
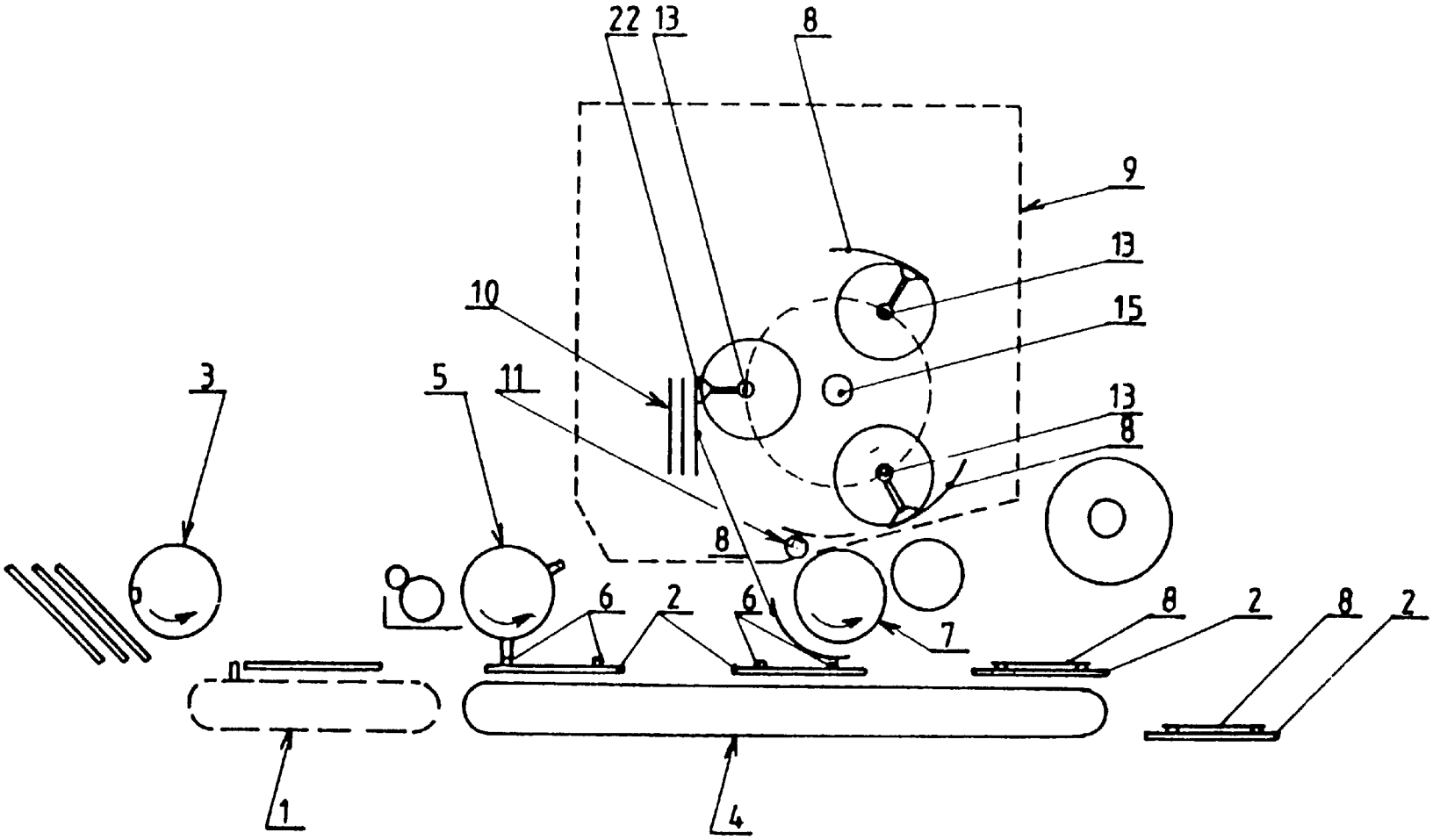
FIG. 1 is a diagrammatic lateral front view of a linear machine for producing composite boxes with an internal bag equipped with a feeder conforming to the invention.

FIG. 1 shows at 1 a suction conveyor for directing one at a time the cut and grooved carton blanks 2 intended to constitute the composite box cases with an internal bag, said blanks being placed on the conveyor 1 with the aid of a suitable positioning device 3.

The cases 2 are transferred onto a conveyor 4 disposed in the projection of the conveyor 1 where they are firstly spread with glue by a glue spreading device 5 for depositing on the upper face of each blank 2 toe glueing lines of the bag needing to be deposited on the case and whose positioning needs to be extremely accurate. By way of illustration, two of these glueing lines are shown at 6 on FIG. 1.

The installation of FIG. 1 comprises a suction cylinder 7 of the type used on "cellophaners" or machines to lay the windows of window boxes, said cylinder transferring onto the blank 2 passing under it a bag 8 made up, for example, of a thin transparent plastic film pocket closed at one extremity and open at the other and fed by a rotary feeder conforming to the invention and denoted in its entirety by the numerical reference 9.

The feeder 9 takes one at a time the bags 8 stored at 10 in the feeder, said bags being stacked with their plane disposed vertically parallel to the axis of the suction cylinder 7.

Later in this text, an embodiment of the storage magazine and submission of the bags 8 shall be described.

A mechanism for picking up and laying down the bags 8 one at a time is provided to take the bags 8 from the magazine 10 and place them on the cylinder 7 and more precisely have them clamped between this cylinder and a press roller 11 applied elastically against the cylinder 7 and driven at the same speed as said cylinder.

Figure 2:
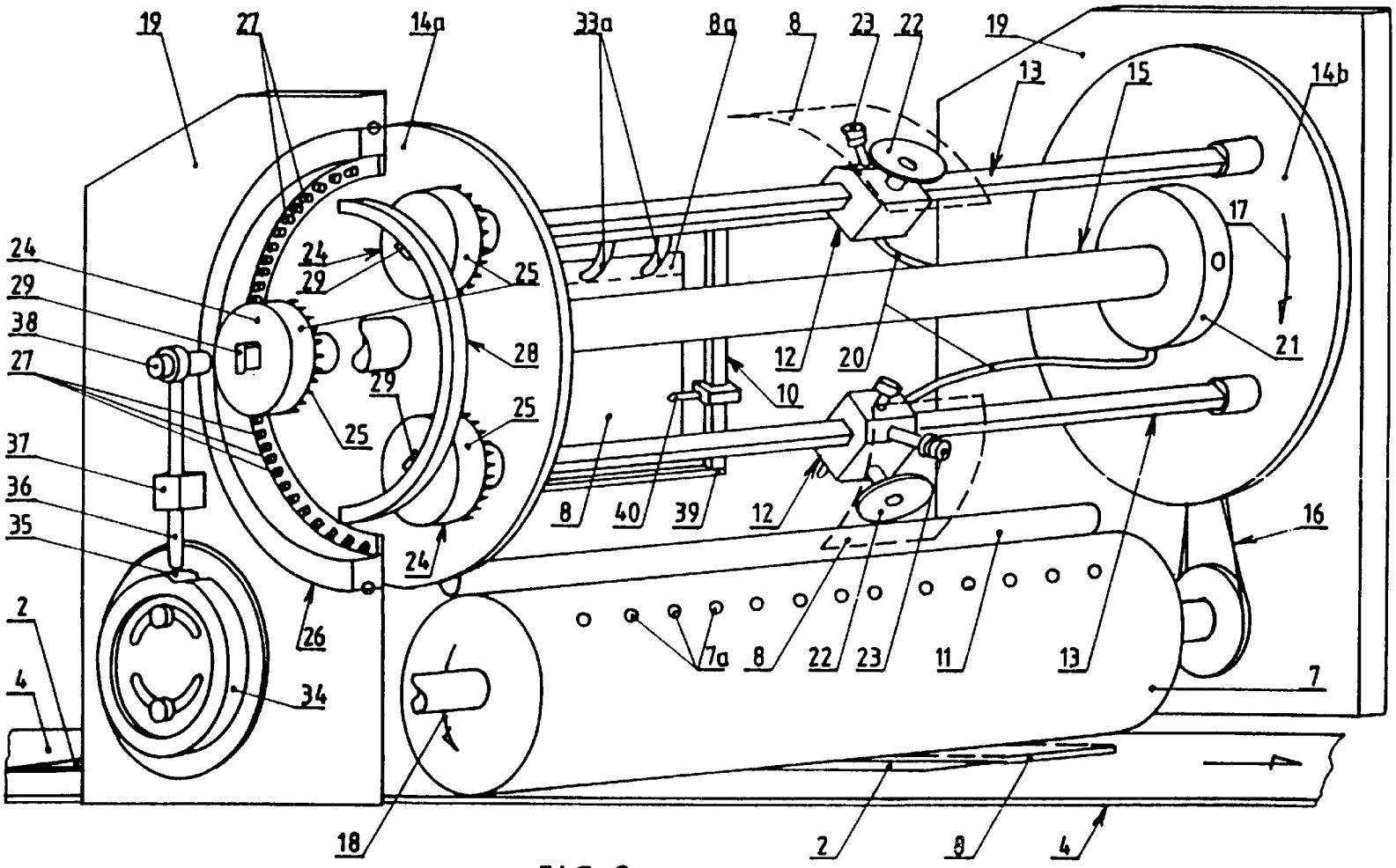
FIG. 2 is a perspective view of means able to provide the picking up and laying member of the feeder of FIG. 1 with the desired hypocycloidal trajectory.

This picking up and laying down mechanism shown on FIG. 2 includes three suction cap carriers 12 borne by bars 13 parallel to the axis of the suction cylinder 7 and mounted rotating in two circular flanges 14a and 14b fixed by wedges on a central shaft 15, also parallel to the axis of the cylinder 7. The bars 13 are equidistant from the shaft 15 and offset by 120 degrees from one another.

The shaft 15 and the flanges 14a and 14b are rotary-driven in synchronism with the cylinder 7 by a suitable transmission 16, the direction of rotation 17 of the unit 15–14a, 14b being opposite that 18 of the cylinder 7.

The unit 15–14a, 14b is mounted whirling in two lateral vertical frame plates 19.

Each suction cap or cup carrier 12 is mounted fixed but may be adjusted along the bars 13 and includes a set of two suction caps or cups connected by one flexible pipe 20 and one toric connector 21 to a vacuum source (not shown). One (22) of the two suction caps has a surface approximately larger than that of the other suction cap or cup 23.

The bars 13 traverse one (14a) of the flanges and are integral at their extremity with a gear 24 provided with teeth 25 able to gear with a crown fraction 26 integral with the frame 19 and internally bearing a toothing formed of tappets or projections 27 situated on the trajectory of the teeth 25.

The crown 26 extends onto an arc of a circle of 180 degrees and is coaxial to the axis of the shaft 15. In the embodiment shown, the half-crown 26 extends from the lowest point of the bars when the unit 15–14a. 14b is rotated, this point corresponding to the point for laying down a bag 8 (FIG. 3) on the cylinder 7 up to the highest point.

Figure 3:
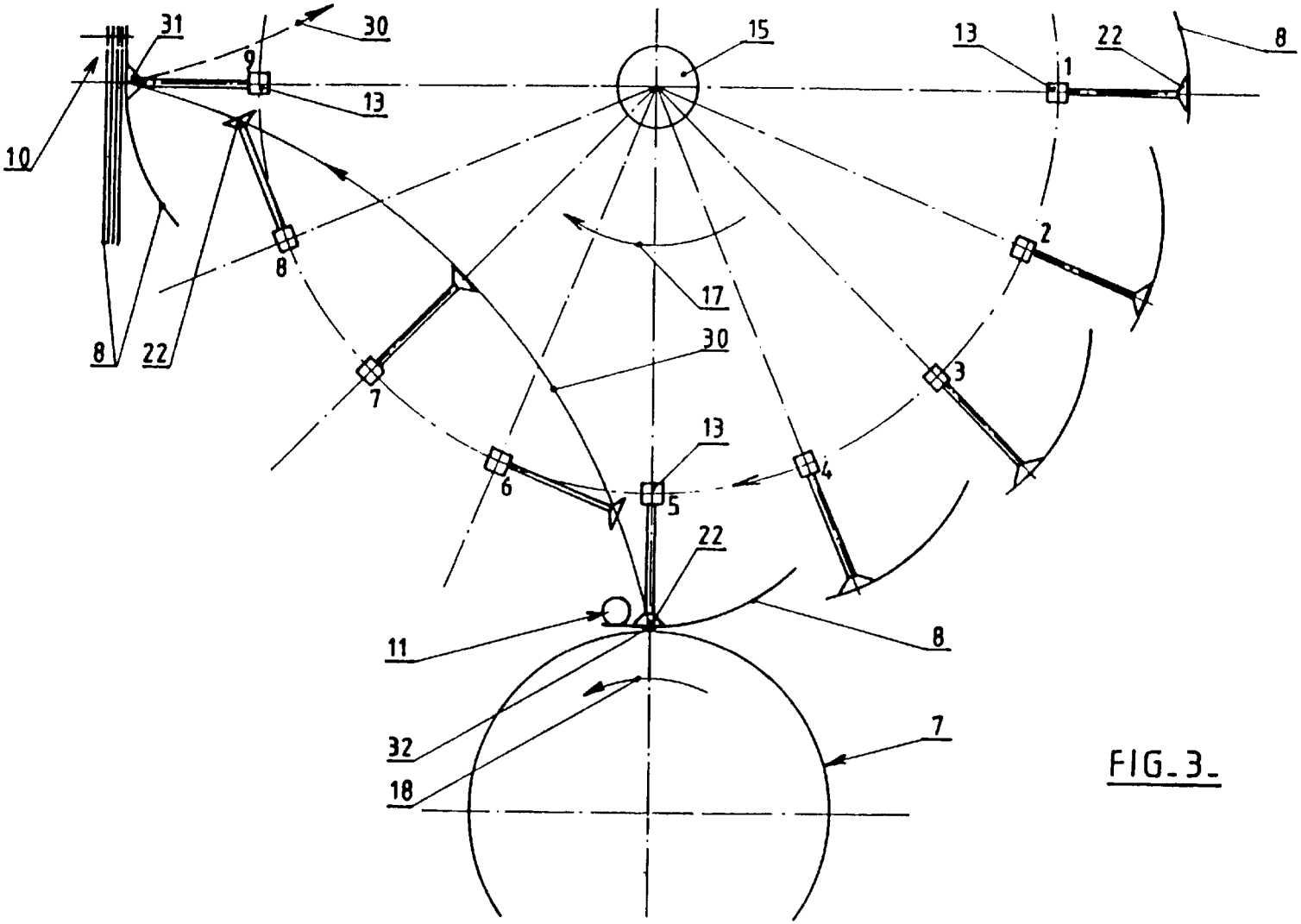
FIG. 3 illustrates the hypocycloidal trajectory of the picking up and laying down suction cap between the laying down and picking up stations.

When rotating, the flange 14a has one gear 24 at the lower extremity of the half-crown 26, the teeth 25 of the gear 24 gearing with the tappets 27 and the bar 13 in question rotates around its axis when the shaft 15 continues to rotate so that the suction caps 22, 23 of the suction cap or cup carrier 12 of said bar 13 start to describe hypocycloids, as shown on FIG. 3. When they arrive at the top of the half-crown 26, the teeth 25 escape from the tappets 27 and rotation of the bar 13 with respect to the flange 14a is blocked by a semiannular slide 28 taking the relays of the half-crown over 180 degrees and stressing a projection 29 integral with each gear 24 so as to render the bars 13 immobile with respect to the flanges 14A, 14b until said bars return to their low travel point.

FIG. 3 shows the hypocycloidal trajectory, 30 of the central contact point of the suction cap or cup 22 with a bag 8 with the turning back point 31 of the suction cap or cup 22 at the height of the magazine 10 and the turning back point 32 (theoretical) of the suction cap 22 at the height of the cylinder 7.

In the embodiment shown, the gears 24 are dimensioned so that between the two successive turning back points (32 then 31 along the direction of rotation 17 of the shaft 15), the shaft 15 has described an arc of 90 degrees, the magazine 10 of the feeder being placed accordingly.

Such a hypocycloidal trajectory 30 allows the suction cap or cup 22 to contact a bag 8 from the pile of the magazine 10 with an approach perpendicular to the bag and nil speed at the moment of contact, which shall also be that of the vacuum applied to the suction cap 22, which is expressed by a projection with a particularly well-defined, accurate and repetitive positioning of the suction cap at any rotation speed of the shaft 15, that is at any speed for routing the flanks 2 by the conveyor 4.

Beyond the turning back point 31, the suction cap 22 continues its ascending hypocycloidal movement (30') as far as a point diametrically opposing the point 32 with respect to the shaft 15 and corresponding to the moment when the gear 24 comes out of the half-crown 26 at its upper extremity. During this second hypocycloidal trajectory portion (30'), the suction cap or cup 22 moves along with it a bag 8. From the top point of the trajectory of the suction cap pr cup 22, the latter then describes a simple circle as far as the turning back point 32, as indicated on the right portion of FIG. 3, the suction cap or cup 22 with its bag 8 being orientated outwardly. At the point p, the bag 8 is freed by the suction cap and is taken onto the cylinder 7 by means of the suction orifices 7a of the cylinder 7 (FIG. 2). At the point 32 the suction cap touches lightly the cylinder 7 with a relative nil speed, the cylinder 7 and the rotary unit 13-15-22 being driven at the same speed of rotation.

The positioning of the bag on the cylinder 7 is thus particularly precise and repetitive at any speed.

The advantage of the hypocycloidal trajectory of the suction cap 22 from said point 32 is effected so as to free the suction cap 22 opposite the press roller 11 which would be situated on the trajectory of said suction cap or cup if start of the hypocycloidal trajectory did not occur from the point 32. At point 32, cap 22 moves relative to and in a direction opposite to a point on press roller 11 and a point on suction cylinder 7 at point 32, during transfer of each sheet element to the press roller and the suction roller.

So as to facilitate matter C, the trajectory of the bag 8, from the time it is picked up and laid down, is described and shown on FIGS. 1 and 3 with a single suction cap 22. In actual fact, the two suction caps or cups 22 and 23 pick up the bag but accordions to slightly different processes shown firstly by FIGS. 4a to 4i, and secondly by FIGS. 5a to 5c and linked to the existence of special means for facilitating the pulling up of a bag 8 in the magazine 10. First of all, reference shall be made to FIG. 6 showing a mode for conditioning the bags 8, this mode being particularly adapted to the device of the invention.

Figure 6:
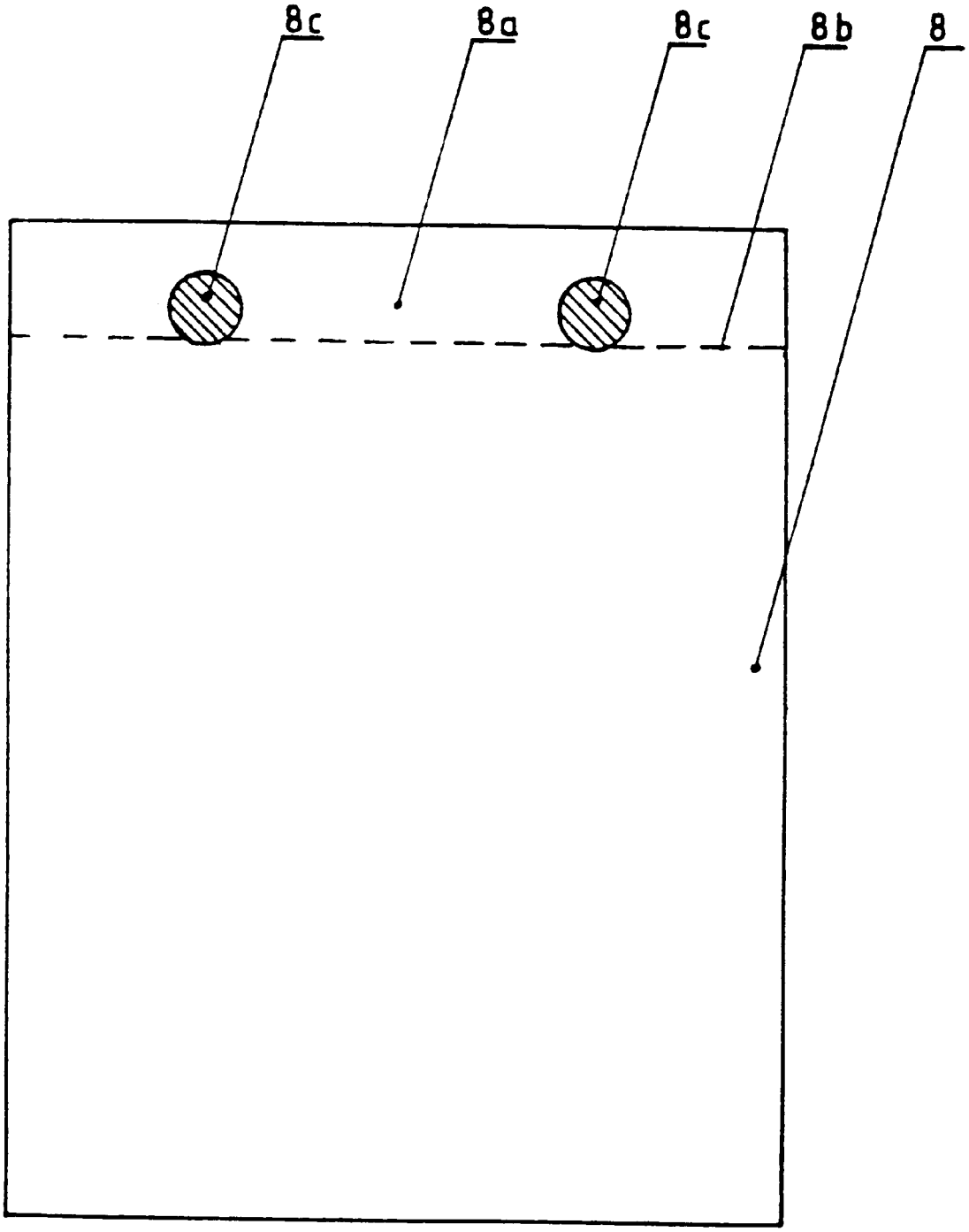
FIG. 6 shows a heel bag.

This FIG. 6 shows a bag 8 in its flat state connected at its upper portion to a heel 8a separated from the bag by a line of incisions 8b. The heel 8a is constituted, for example, by the projection of one of the walls of the bag 8. In addition, the heel 8a is pierced with two holes 8c intersecting with respect to the incision line 8b.

Figure 7:
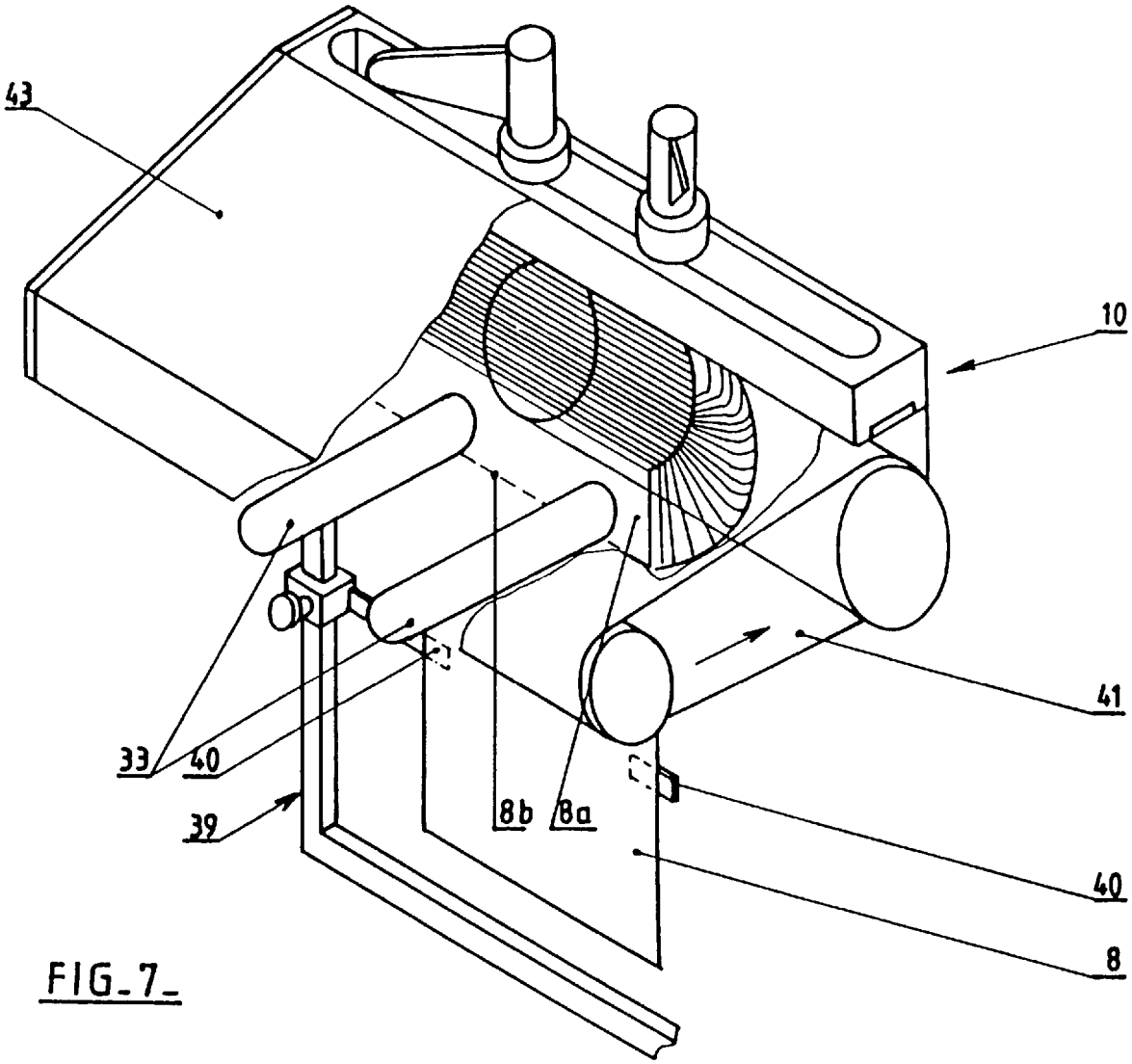
FIG. 7 is a diagrammatic perspective view of a bag magazine conforming to FIG. 6.
Figure 8:
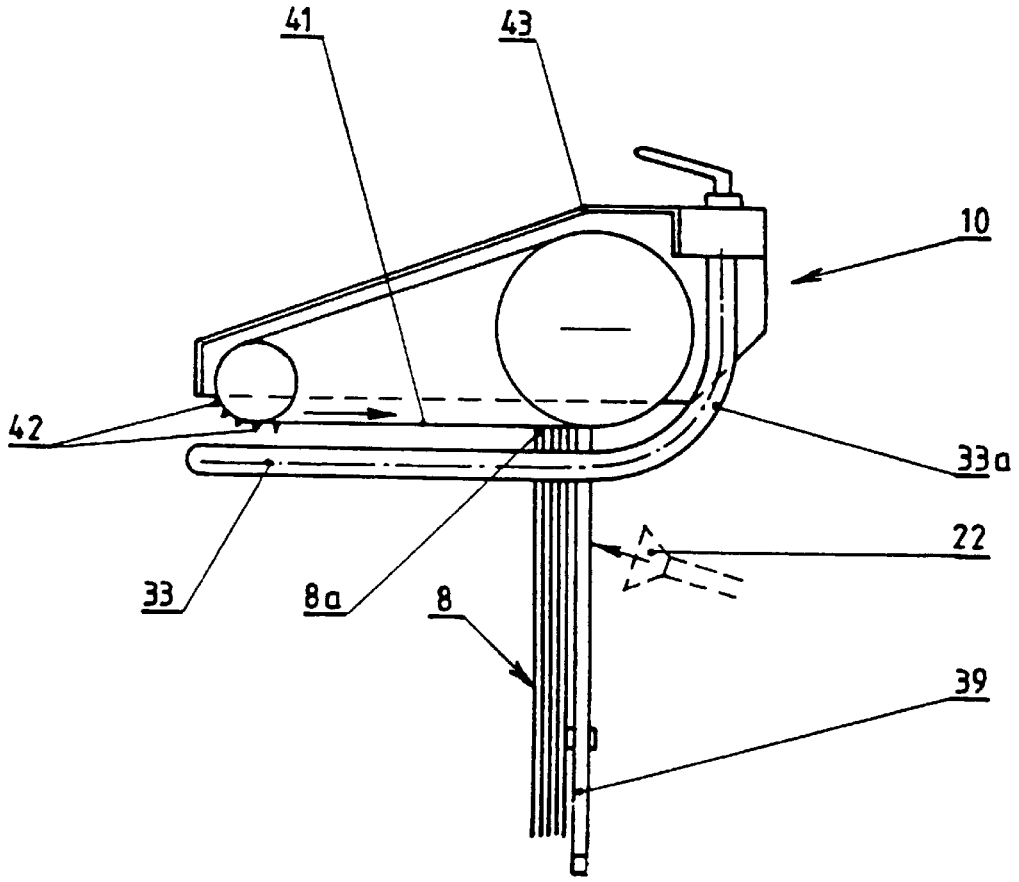
FIG. 8 is a lateral front view of the magazine of FIG. 7.

The bags 8 and their heel are stacked and the unit is joined onto two fingers 33 of the magazine 10, an embodiment of this to be described further in detail with reference to FIGS. 7 and 8.

Reverting now to FIGS. 4a to 4i, it shall be observed that each bag 8 is picked up by the large suction cap 22 close to the separation line 8b and by the small suction cap 23 close to the other extremity.

The precise method for picking and pulling up a bag 8 from the magazine 10 is shown on FIGS. 4a to 4f.

Figures 4A, 4B, 4C, 4D, 4E, 4F:
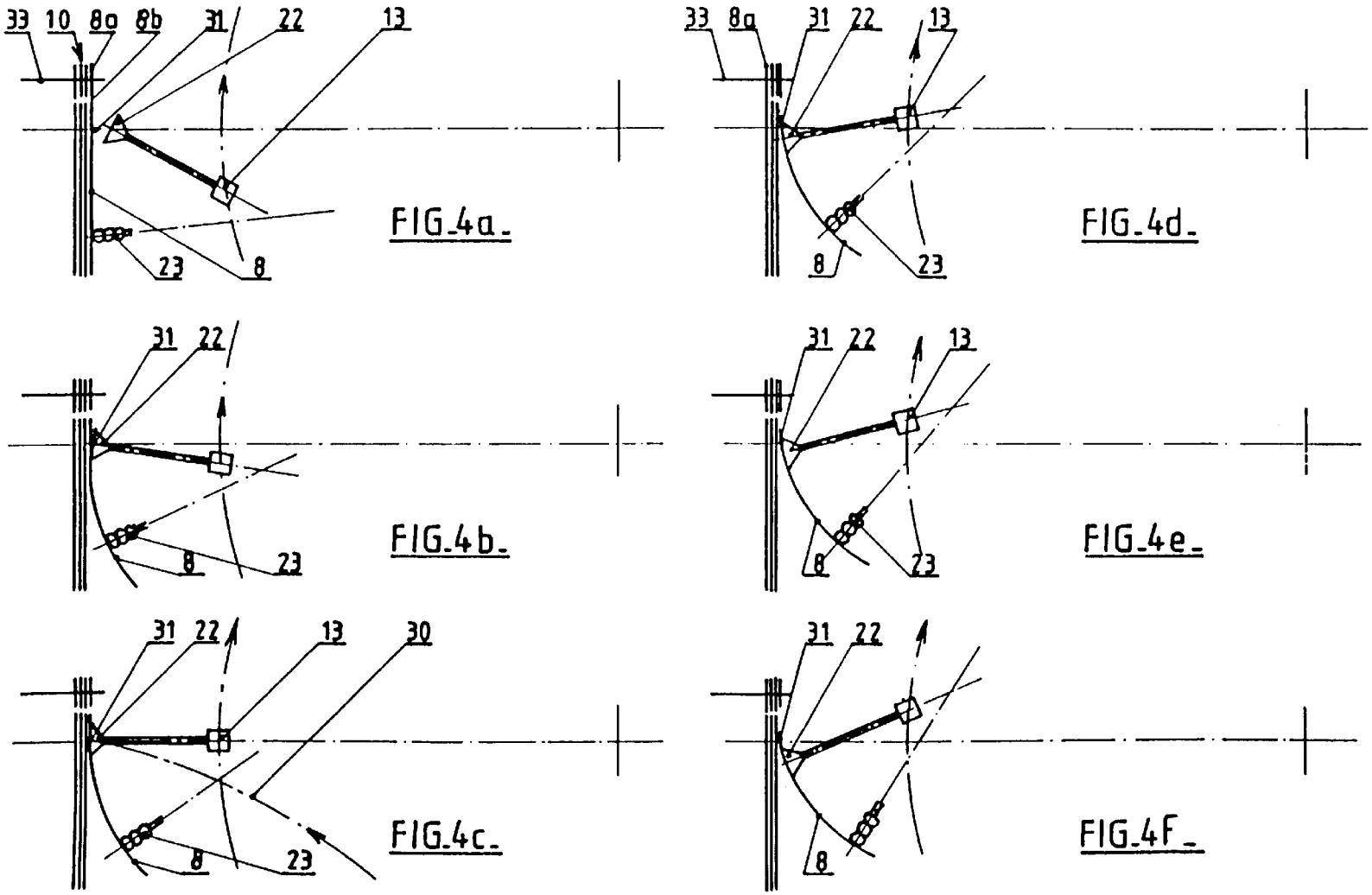
FIGS. 4a to 4i show the various successive phases for picking up a bag.
Figure 4G:
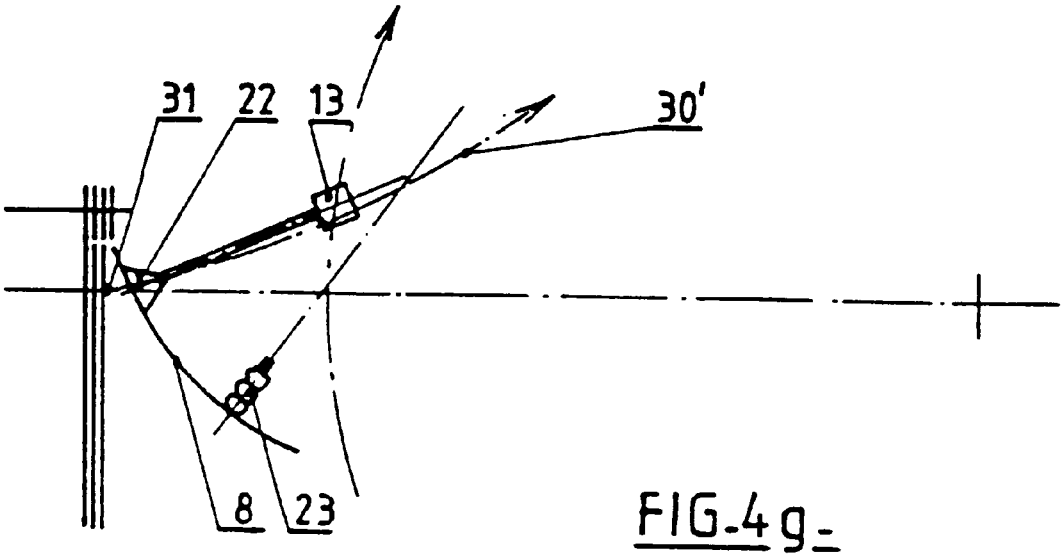
Figure 4H:
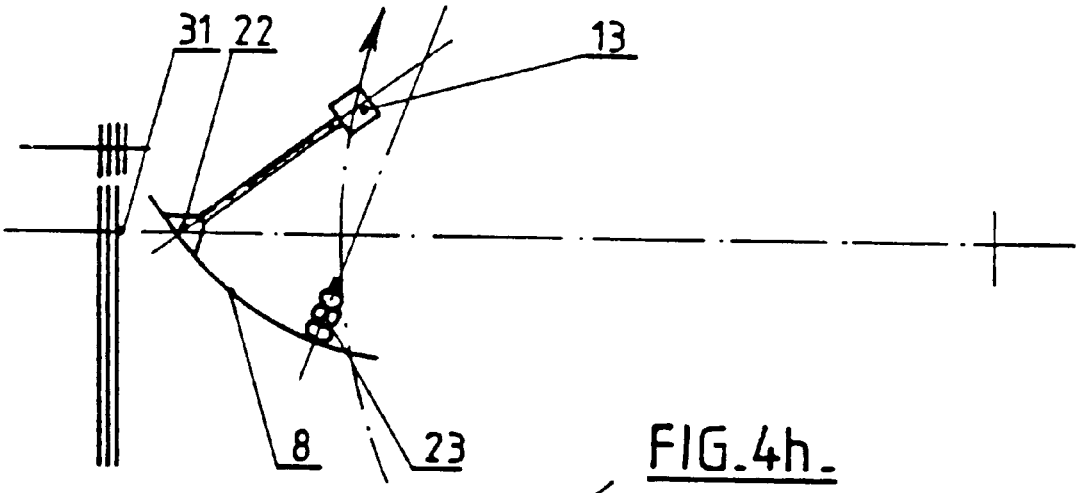
Figure 4I:
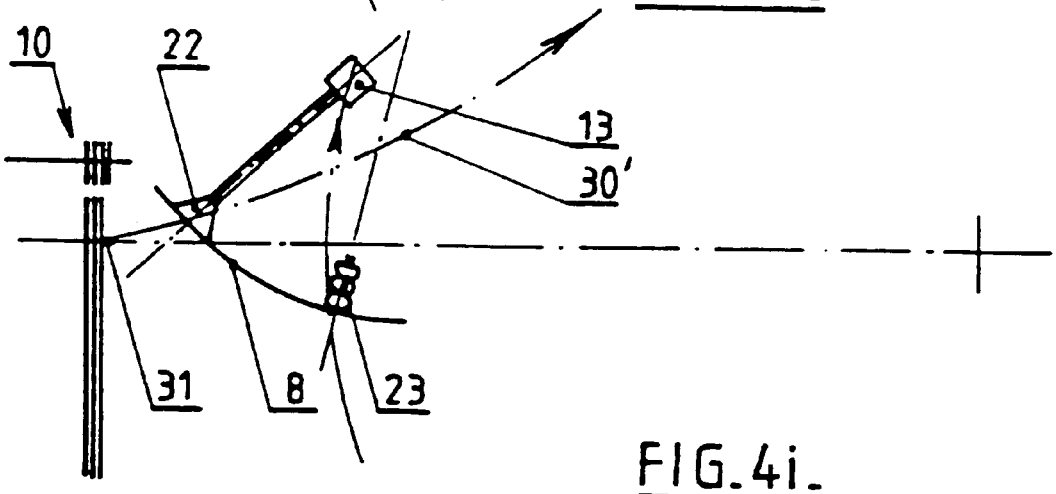

FIGS. 4a to 4c show the end of the hypocycloidal travel 30 of the suction cap or cup 12 as far as the turning back point 31 (FIG. 4c).

The small suction cap 23 (FIG. 4a), by virtue of its position with respect to the suction cap 22 on the suction cap carrier 12 and fastening of the latter onto the bar 13, firstly contacts the bag 8 at the lower portion of the station 10. The suction cap 23 is then placed under a vacuum, control of the suction caps 23 and 22 being indexed on rotation of the flanges 14a 14b and thus of the cylinder 7.

The suction cap 23 starts to separate the lower portion of the bag 8 (FIG. 4b) when the suction cap 22 starts to contact the upper portion of said bag.

When the suction cap or cup 22 is at the turning back point 31 (FIG. 4c), it is placed in a vacuum so as to pick up the upper portion of the bag.

So as to facilitate separation of the bag 8 from its heel 8a at the height of the line 8b, a mechanism is then activated so as to temporarily slightly bring the suction caps 22 and 23 backwards. This mechanism shown on FIG. 2 includes a cam 34 able to be adjusted in an annular position and rotary-driven in synchronism with the shaft 15 and provided with a recess 35. The cam 34 acts on a push-button 36 sliding into a guide 37 integral with the frame 19 and joined at its extremity to a journal 38 integral with the half-crown 26 so as to provide the latter with a slight movement for rotating around the axis of the shaft 15, the half-crown to this effect being mounted on a ball bearing on the frame 19.

When the recess 35 appears under the push-button 36, which occurs when the suction cap 22 reaches the turning back point 31 (FIG. 4c), the push-button 36, stressed continuously towards the bottom by a suitable spring (not shown), slightly lowers and causes the half-crown 26 to pivot towards the bottom. This makes the gear 24 slightly pivot the suction caps 22 and 23, as shown on FIGS. 4d to 4f. The backward movement of the suction cap or cup 22-procures (FIG. 4d) a dry pulling up of the bag 8 from its heel 8a.

When the push-button 36 leaves the recess 35 and reassumes its previous position, the suction caps gradually reassume (FIGS. 4g to 4i) their normal position, the suction cap 22 refinding the normal hypocycloidal trajectory 30' from the turning back point 31.

Figure 5A:
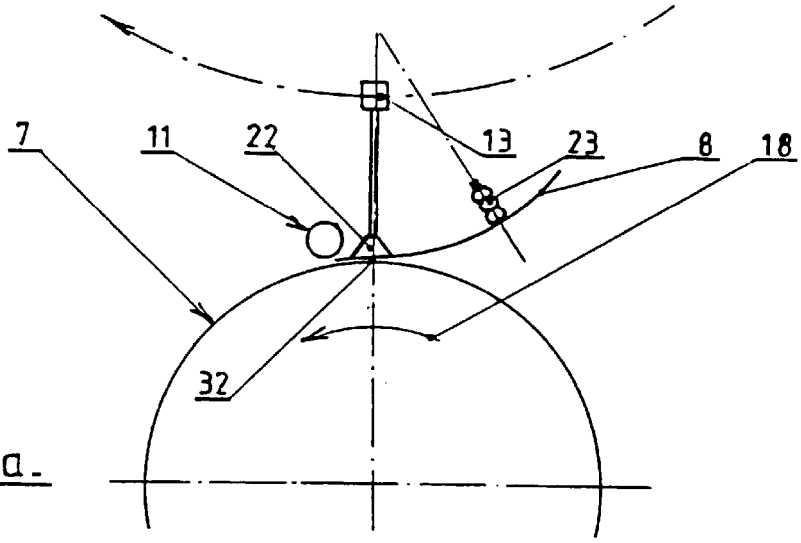
FIGS. 5a to 5c illustrate three successive phases for laying down a bag.
Figure 5B:
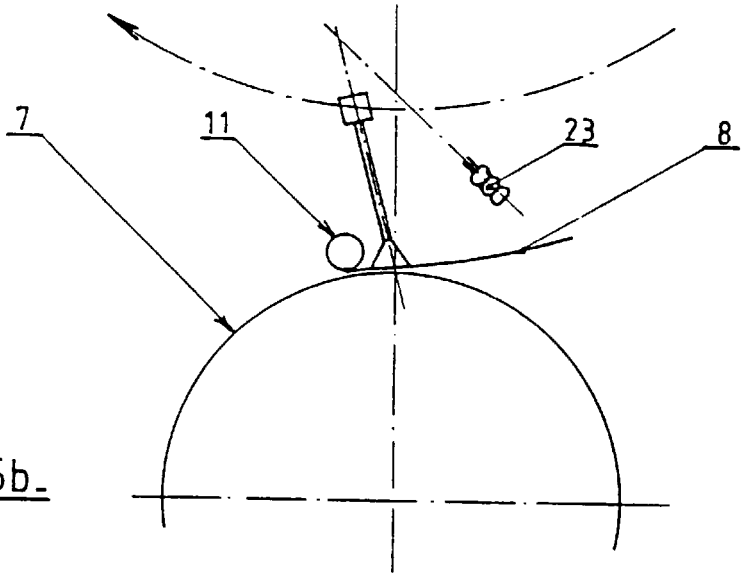
Figure 5C:
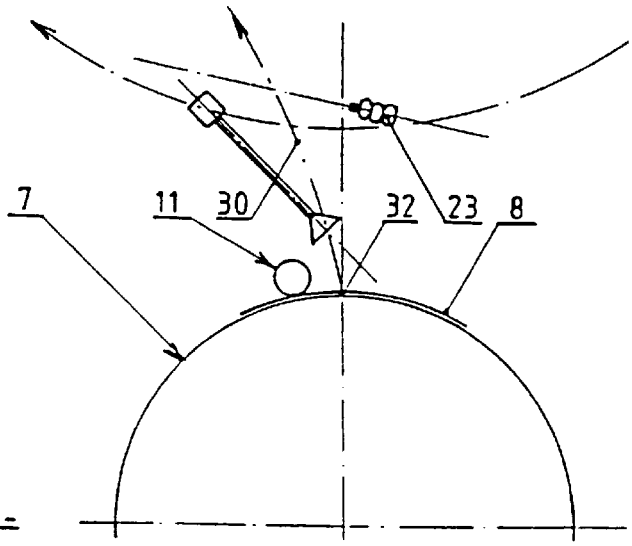

FIGS. 5a to 5c respectively illustrate the reaching by the suction cap or cup 22 of the point 32 (laying down of the bag on the cylinder 7), the bag 8 still being held by the two suction caps or cups 22 and 23, then (FIG. 5b) the start of the hypocycloidal trajectory 30 of the suction cap or cup 22 also driving that of the suction cap or cup 23 which withdraws, the suction cap or cup 23 being placed in the atmosphere so as to loosen the bag 8 as well as the suction cap or cup 22, and finally (FIG. 5c) shows the retraction towards the inside of the suction caps or cups 22 and 23 so as to escape to the press roller 11.

FIGS. 7 and 8 show one embodiment of a magazine feeder 10 storing the bag 8/heel 8a units vertically side by side. These units are suspended from two horizontal fingers 33 engaged in the holes 8c.

The pick up plane of the bags 8 is delimited by a vertical frame 39 provided with fingers 40 for the peripheral retention of the bags.

Beyond the frame 39 (suction cap or cup 22 side, FIG. 8). the fingers 33 are bent back upwardly at 33a so as to collect and subsequently remove the heels 8a which remain attached to the fingers 33 after pulling up of the bags 8.

An endless belt 41 provided with projections 42 and driven by suitable means constantly pushes the heels 8a with and then without their bag towards the incurved portion 33a of the fingers in the direction of the upper portion of the box 43 of the feeder or magazine 10 from which the heels 8a are to be removed, the latter being easily extracted from the fingers 33 via the groove provided in the holes 8c by the line 8b.

Instead of acting on the suction cylinder 7, the bags 8 may be laid down directly on the belt conveyor 4 with the aid of a press roller similar to the roller 11 applied elastically against said belt and driven in synchronism with the latter.

The feeder or magazine 10 is translation-adjustable and is designed according to the type of sheet elements to be placed, the presentation of the elements still, being the same, that is with the elements stacked flat and the pile placed perpendicular to the hypocycloidal approach trajectory of the picking up suction cap(s) or cup(s) close to the turning back point of the bag pick up station.

Finally, the invention is not merely limited to the embodiments shown and described above, but on the other hand covers all possible variants, especially as regards the nature, shapes and dimensions of the sheet elements to be assembled or secured to a flat support, irrespective of its nature, type or dimensions. Similarly, the pick up and carrier system mounted on the member 12 may be disposed differently with a single suction cap or cup or more than two suction caps disposed according to any configuration. A different number of bars 13 and thus a different number of suction cap carriers 12, namely less than or more than three, may be provided and several magazines 10 may also be provided if place so allows, provided several sets of members, such as 24 to 29 and 34 to 38, are supplied to control the various hypocycloidal trajectories and detaching the bags from the various magazines.

What is claimed is:

1. A rotary feeder for accurately placing sheet elements on flat supports, comprising:

at least one fixed, translation-adjustable magazine for storing stacked sheet elements;

a suction cylinder cooperating with a device for continuously feeding flat supports, each flat support to be provided with one sheet element;

a press roller located adjacent to and cooperating with said suction cylinder;

at least one picking up member for picking up and transferring the sheet elements one at a time to said suction cylinder; and moving means for supporting and driving said picking up member along an at least partly hypocycloidal trajectory so that two turning back points of the hypocycloidal trajectory coincide with a first point for picking up each sheet element in said magazine and a second point for transferring each sheet element to said suction cylinder adjacent said press roller and so that said picking up member, from said second point, avoids said press roller while transferring each sheet element to said suction cylinder;

whereby each sheet element is attached at the first point to said picking up member with a relative nil speed between said picking up member and said fixed magazine, and at the second point each sheet element is disengaged from said picking up member during a turning back movement of said picking up member with respect to said press roller, thus ensuring an accurate continuous positioning at high speed of the sheet elements on the flat supports.

2. A rotary feeder according to claim 1 wherein said suction cylinder is located adjacent said device, said device comprising a conveyor for feeding the flat supports adjacent to said cylinder.

3. A rotary feeder according to claim 1 wherein said device comprises a conveyor belt.

4. A rotary feeder according to claim 1 wherein said picking up member comprises at least one suction cup; and said moving means comprises at least one suction sup carrier mounted on a support for rotation around a carrier axis parallel to an axis of said suction cylinder and driven in rotation with said support around a trajectory axis which is parallel to said axis of said suction cylinder and in synchronism with a speed of rotation of said suction cylinder, said carrier having indexing means for providing said suction cup with the two turning back points along the hypocycloidal trajectory at respectively the first and second points of picking up and transferring the sheet elements.

5. A rotary feeder according to claim 4 wherein said moving means comprises a gear fastened by wedges onto said carrier axis of the suction cup carrier and a fixed circular toothing centered on said trajectory axis engagable with said gear.

6. A rotary feeder according to claim 4 wherein said magazine comprises bags to be placed on carton blanks of composite boxes, said bags being integral and detachable by pulling up on heels on said bags, said bags with said heels being bundled and stored in said magazine; and said picking up member has back means for providing the picking up member with a slight, well-defined backward movement when a bag is picked up to facilitate the pulling up of the bags.

7. A rotary feeder according to claim 6 wherein said back means further includes rotation means for providing said circular toothing with a slight rotation around said trajectory axis to return the circular toothing to a normal position.

8. A rotary feeder according to claim 7 wherein said rotation means comprises a cam provided with a recess acting on a push-button joined to a bearing on said circular toothing, said cam being indexed by rotation of said support.

9. A rotary feeder according to claim 6 wherein the suction cup carrier comprises first and second suction cups, said first suction cap being oriented to engage the bag close to a pulling up line thereof, said second suction cup being oriented to engage the bag close to an opposite extremity thereof, said second suction cup being disposed to engage the bag before said first suction cup.

10. A rotary feeder according to claim 6 wherein said magazine comprises fixed fingers engagable in holes provided in said heels of the bags, and pushing means for pushing said heels towards a bag in picking up plane defined by a presentation frame provided with positioning fingers, said pushing means removing the heels after pulling up of the bags.

*11. A method for accurately placing sheet elements on flat supports, said method comprising storing a plurality of sheet elements in a storage device, feeding individual flat supports to a location to be joined to a sheet element supplied from said storage device, picking up by at least one picking up member individual sheet elements from said storage device and releasing said individual sheet elements to be joined to said flat supports being fed, driving said picking up member over a curved path including a hypocycloidal trajectory having a first and second turning back point, said first turning back point coinciding with a first point for picking up individual sheet elements from said storage device and said second turning back point coinciding with a second point for releasing each of said sheet elements for joining to said flat supports, said picking up member being driven from said first point along a hypocycloidal trajectory, then along a circular path to said second point, and then along a hypocycloidal trajectory to said first point.*

*12. A method of claim 11, further including attaching said sheet elements at said first point to said picking up member with relative nil speed between said picking up member and said storage device.*

*13. A method of claim 12, further including releasing said sheet elements from said picking up member at said second point onto a suction cylinder.*

*14. A method of claim 12, wherein said picking up member is driven from said first point along a hypocycloidal trajectory for about 90°, then along a circular path for about 180° to said second point, and then along a hypocycloidal trajectory for about 90° to said first point.*

*15. A method of claim 11, wherein said sheet elements are received from said nicking up member at said second point with relative nil speed between said picking up member and said suction cylinder.*

*16. A method for accurately placing sheet elements on flat supports, said method comprising storing a plurality of sheet elements in a storage device, feeding flat supports to a location to be joined to a sheet element supplied from said storage device, picking up individual sheet elements one at a time from said storage device by at least one picking up member, releasing said sheet elements to be joined to said flat supports from said at least one picking up member, transferring the released sheet elements one at a time by a transfer device to a location for joining to said flat supports, driving said at least one picking up member along an at least partially hypocycloidal trajectory so that two turning back points of said hypocycloidal trajectory coincide with a first point for picking up each of said sheet elements from said storage device and a second point wherein each of said sheet elements are released from said at least one picking up member, said driving said at least one picking up member being along a circular path to said second point and then along a hypocycloidal trajectory to said first point, whereby each of said sheet elements are attached at said first point to said at least one picking up member with relative nil speed between said at least one picking up member and said storage device, and at said second point each of said sheet elements are released from said at least one picking up member during a turning back movement of said at least one picking up member thereby avoiding said transfer device, thus ensuring an accurate continuous positioning at high speed of said sheet elements on said flat supports.*

*17. A method of claim 16, wherein said driving said at least one nicking up member is in synchronization with the operation of said transfer device whereby said sheet elements are transferred from said at least one picking up member to said transfer device at relative nil speed therebetween.*

*18. A rotary feeder for accurately placing sheet elements on flat supports, said rotary feeder comprising storage means for storing a Plurality of sheet elements, transfer means for feeding flat supports to a location to be joined to said sheet elements supplied from said storage means, at least one picking up member for picking up individual sheet elements from said storage means and releasing said individual sheet elements to be joined to said flat supports fed by said transfer means, and moving means for driving said at least one picking up member over a curved path including a hypocycloidal trajectory having a first and second turning back point, said first turning back point coinciding with a first point for picking up individual sheet elements from said storage means and said second turning back point coinciding with a second point for releasing each of said sheet elements for joining to said flat supports fed by said transfer means, said moving means driving said at least one picking*

*up member from said first point along a hypocycloidal trajectory, then along a circular path to said second point, and then along a hypocycloidal trajectory to said first point.*

*19. A rotary feeder according to claim 18, wherein said moving means in cooperation with said at least one picking up element is operative for attaching individual sheet elements at said first point to said at least one picking up member with relative nil speed between said at least one picking up member and said storage means, and is operative for releasing from said at least one picking up member said individual sheet elements at said second point for joining to said flat supports fed by said transfer means.*

*20. A rotary feeder according to claim 19, wherein said moving means drives said at least one picking up member from said first point along a hypocycloidal trajectory for about 90°, then along a curved path for about 180° to said second point, and then along a hypocycloidal trajectory for about 90° to said first point.*

*21. A rotary feeder according to claim 18, wherein said sheet elements are received from said at least one picking up member at said second point during a turning back movement of said at least one picking up member with respect to said second point.*

*22. A rotary feeder of claim 18, further including a suction cylinder for transferring said sheet elements from said at least one picking up member to said flat supports to be joined thereto.*

*23. A rotary feeder of claim 22, wherein said sheet elements are received by said suction cylinder from said at least one picking up member at relative nil speed therebetween.*

*24. A rotary feeder for accurately placing sheet elements on flat supports, said rotary feeder comprising storage means for storing a plurality of sheet elements, first transfer means for feeding flat supports to a location to be joined to a sheet element supplied from said storage means, at least one picking up member for picking up individual sheet elements one at a time from said storage means and releasing said individual sheet elements to be joined to a flat support fed by said first transfer means, second transfer means for transferring individual sheet elements released from said at least one picking up member to a location adjacent said first transfer means for joining to a flat support fed thereby, and moving means for driving said at least one picking up member along at least a partially hypocycloidal trajectory so that two turning back points of said hypocycloidal trajectory coincide with a first point for picking up each said sheet element in said storage means and a second point for transferring each said sheet element to said second transfer means so that said at least one picking up member, from said second point, avoids said second transfer means while transferring each said sheet element thereto, wherein said moving means drives said at least one picking up member along a curved path to said second point and then along a hypocycloidal trajectory to said first point, whereby each said sheet element is attached at said first point to said at least one picking up member with relative nil speed between said at least one picking up member and said storage means, and at said second point each said sheet element is discharged from said at least one picking up member during a turning back movement of said at least one picking up member with respect to said second transfer means, thus ensuring an accurate continuous positioning at high speed of said sheet elements on said flat supports.*

*25. A rotary feeder of claim 24, wherein said storage means comprises a translation-adjustable fixed magazine.*

*26. A rotary feeder of claim 25, wherein the operation of said second transfer means is synchronized with the operation of said moving means such that said sheet elements are transferred from said at least one picking up member to said second transfer means with relative nil speed therebetween.*

*27. A rotary feeder of claim 26, wherein said sheet elements from said first point to said second point travels along a circular path having said portion tangent to an outer surface of said second transfer means.*

*28. A rotary feeder of claim 24, wherein said second transfer means comprises a suction cylinder.*

*29. A rotary feeder of claim 24, wherein said second transfer means comprises a press roller.*

*30. A method for accurately placing sheet elements on flat supports, said method comprising storing a plurality of sheet elements in a storage device, feeding individual flat supports to a location to be joined to a sheet element supplied from said storage device, picking up by at least one picking up member individual sheet elements from said storage device and releasing said individual sheet elements to be joined to said flat supports being fed, driving said picking up member over a curved path including a hypocycloidal trajectory having a first and second turning back point, said first turning back point coinciding with a first point for picking up individual sheet elements from said storage device and said second turning back point coinciding with a second point for releasing each of said sheet elements for joining to said flat supports, releasing said sheet elements from said picking up member at said second point onto a suction cylinder, said picking up member being driven from said first point along a hypocycloidal trajectory, then along a circular path to said second point, and then along a hypocycloidal trajectory to said first point.*

*31. A method for accurately placing sheet elements on flat supports, said method comprising storing a plurality of sheet elements in a storage device, feeding individual flat supports to a location to be joined to a sheet element supplied from said storage device, picking up by at least one picking up member individual sheet elements from said storage device and releasing said individual sheet elements to be joined to said flat supports being fed, driving said picking up member over a curved path including a hypocycloidal trajectory having a first and second turning back point, said first turning back point coinciding with a first point for picking up individual sheet elements from said storage device and said second turning back point coinciding with a second point for releasing each of said sheet elements for joining to said flat supports, said picking up member being driven from said first point along a hypocycloidal trajectory for about 90°, then along a circular path for about 180° to said second point, and then along a hypocycloidal trajectory for about 90° to said first point.*

*32. A rotary feeder for accurately placing sheet elements on flat supports, said rotary feeder comprising storage means for storing a plurality of sheet elements, transfer means for feeding flat supports to a location to be joined to said sheet elements supplied from said storage means, at least one picking up member for picking up individual sheet elements from said storage means and releasing said individual sheet elements to be joined to said flat supports fed by said transfer means, and moving means for driving said at least one picking up member over a curved path including a hypocycloidal trajectory having a first and second turning back point, said first turning back point coinciding with a first point for picking up individual sheet elements from said storage means and said second turning back point coinciding with a second point for releasing each of said sheet elements for joining to said flat supports fed by said transfer means, said moving means driving said at least one picking*

*up member from said first point along a hypocycloidal trajectory for about 90°, then along a circular path for about 180° to said second point, and then alone a hypocycloidal trajectory for about 90° to said first point.*

*33. A rotary feeder for accurately placing sheet elements on flat supports, said rotary feeder comprising storage means for storing a plurality of sheet elements, first transfer means for feeding flat supports to a location to be joined to a sheet element supplied from said storage means, at least one picking up member for picking up individual sheet elements one at a time from said storage means and releasing said individual sheet elements to be joined to a flat support fed by said first transfer means, second transfer means for transferring individual sheet elements released from said at least one picking up member to a location adjacent said first transfer means for joining to a flat support fed thereby, and moving means for driving said at least one picking up member along at least a partially hypocycloidal trajectory so that two turning back points of said hypocycloidal trajectory coincide with a first point for picking up each said sheet element in said storage means and a second point for transferring each said sheet element to said second transfer means so that said at least one picking up member, from said second point, avoids said second transfer means while transferring each said sheet element thereto, said sheet elements from said first point to said second point travel along a circular path having a portion tangent to an outer surface of said second transfer means, whereby each said sheet element is attached at said first point to said at least one picking up member with relative nil speed between said at least one picking up member and said storage means, and at said second point each said sheet element is discharged from said at least one picking up member during a turning back movement of said at least one picking up member with respect to said second transfer means, the operation of said second transfer means synchronized with the operation of said moving means such that said sheet elements are transferred from said at least one picking up member to said second transfer means with relative nil speed therebetween, thus ensuring an accurate continuous positioning at high speed of said sheet elements on said flat supports.*

* * * * *

UNITED STATES PATENT AND TRADEMARK OFFICE

CERTIFICATE OF CORRECTION

PATENT NO. : Re. 36,329

DATED : October 5, 1999

INVENTOR(S) : Francis Laroche

It is certified that error appears in the above-identified patent and that said Letters Patent is hereby corrected as shown below:

Title page, item [75], "Couronne" should read --La Couronne--.

Column 5, line 5, after "14a" insert --,--.

Column 8, line 14, "nicking" should read --picking--.
Column 8, line 46, "nicking" should read --picking--.
Column 8, line 53, "Plurality" should read --plurality--.
Column 10, line 6, "a" should read --said-- and before "portion" insert --a--.
Column 11, line 3, "alone" should read --along--.

Signed and Sealed this

Fourth Day of July, 2000

*Attest:*

*Attesting Officer*

Q. TODD DICKINSON

*Director of Patents and Trademarks*